E. CORNELL.
Mole-Plow.
No. 3,456. Patented Feb. 28, 1844.
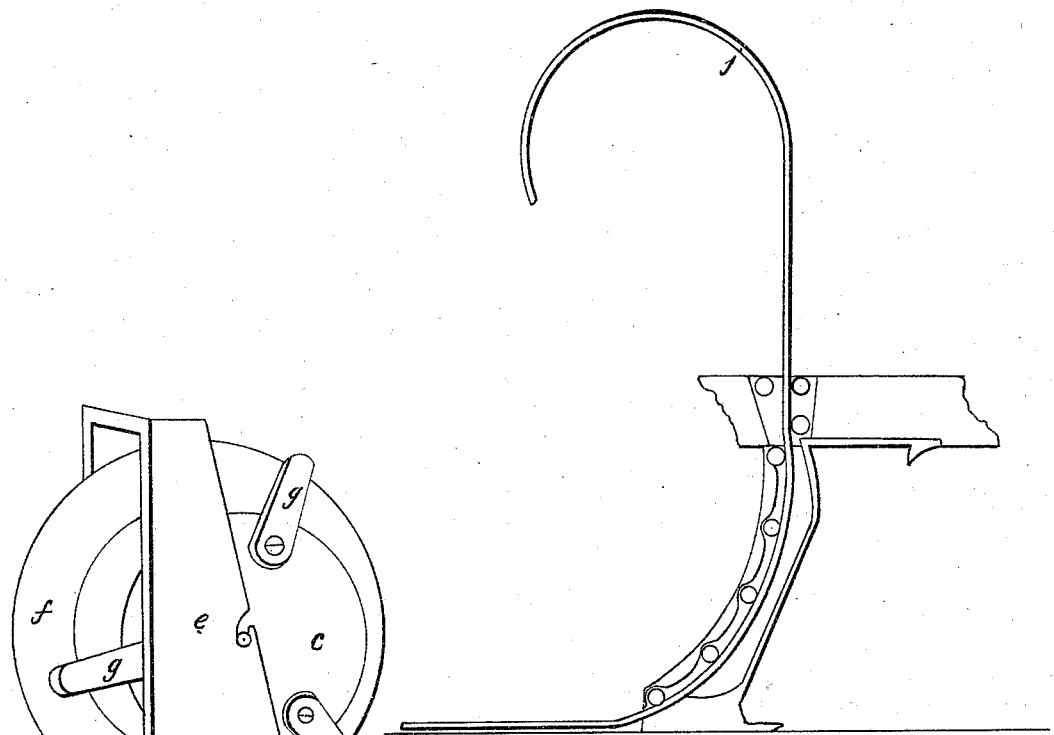
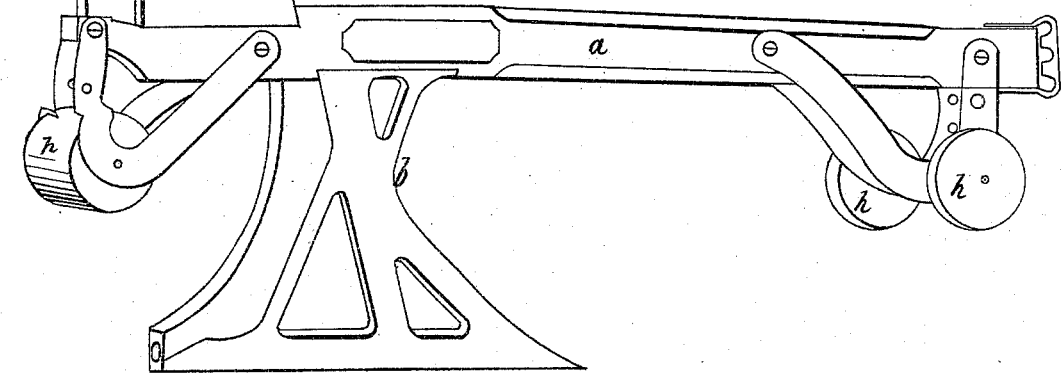

UNITED STATES PATENT OFFICE.

EZRA CORNELL, OF ITHACA, NEW YORK.

MACHINE FOR CUTTING TRENCHES AND LAYING PIPES.

Specification forming part of Letters Patent No. 3,456, dated February 28, 1844.

*To all whom it may concern:*

Be it known that I, EZRA CORNELL, of Ithaca, in the county of Tompkins and State of New York, have invented a new and useful Machine or Implement for Laying Metallic Pipes in the Earth, which I denominate "Cornell's Improved Pipe-Layer;" and I do hereby declare that the following is a full and exact description of the construction and operation of the same, reference being had to the annexed drawings, making a part of this specification, in which—

Figure 1 is a perspective view, and the part thereon marked $a$ is the beam, by which the implement is drawn and making a part thereof.

The part marked $b$ is a cast or wrought iron furrow or trench cutter, the rear part of which is a hollow curvature, either cast with the main body of the cutter or formed separately of plate-iron and affixed to the main body by screws or bolts. Said curvature is also represented by the sectional drawings hereto annexed and made part of this specification at Fig. 2. It is supplied with sheaves or friction-pulleys having concave edges of suitable size to receive a section of the pipe as it passes from the reel or drum through said curvature to the earth.

The part marked $c$ is a drum or reel, from which the pipe is drawn through an aperture in the beam, which aperture is also protected by sheaves or friction-pulleys, and forms a part of the hollow curvature heretofore described, at the part marked $d$.

The part marked $e$ is the frame, within which said drum or reel moves upon its axes. Said drum or reel is withdrawn from and replaced in said frame at pleasure and as necessity may require for loading the same with pipe. Upon one end of said drum or reel stops are affixed, or a rim of wood is attached (marked $f$) to prevent the pipe from sliding off and disorganizing its coil, and on the opposite end of said drum are three or more stops or arms, which are confined by a single bolt or screw, so as to admit of being shifted or turned toward the center of said drum, that the drum may receive a coil of pipe in a mass, and the pipe being thus placed upon the drum, said movable arms or stops, which are marked $g$ in said drawings, are turned to a position that is perpendicular, or nearly so, to the curved surface of the drum, and thereby confine the coil of pipe upon the drum.

$h$ represents the wheels, which may be used to steady the machine and regulate the depth at which the pipe is deposited in the earth.

$i$ represents the braces by which the wheels are attached to the beam of the machine, and which are so contrived as to raise or lower the wheels, and thereby regulate the depth at which the pipe is deposited.

$j$ represents a section of the pipe passing from the drum through the hollow curvature in the beam and back part of the trench-cutter to the earth.

The motion of the machine, when drawn forward with the pipe once confined in the ground, draws the pipe from said drum or reel through the before-described aperture in the beam, thence through the hollow curvature above described, from the interior surface of which the pipe is depended, as well as its progress facilitated by the sheaves or friction-pulleys before described, and separates from the machine as it passes out of said curvature at the bottom thereof, being the point in depth to which the pipe is deposited in the earth. By attaching two trunk-cutters to the same beam, or by multiplying divisions in the above-described curvature two or more pipes may be laid by the same implement at the same time.

What I claim as my invention, and wish to secure by Letters Patent, is—

A furrow or trench cutter, in combination with a curved channel or groove of one or more divisions, (for laying one or more pipes at the same time,) as herein described; and these I claim in combination with the drum, as above described, for the purpose of depositing pipe at any desired depth, the whole being constructed and operating substantially as herein set forth.

E. CORNELL.

Witnesses:
CHAS. MONROE,
THOS. C. AVERY.